United States Patent [19]
Chuang et al.

[11] Patent Number: 6,122,604
[45] Date of Patent: Sep. 19, 2000

[54] DIGITAL PROTECTION CIRCUIT FOR CRT BASED DISPLAY SYSTEMS

[75] Inventors: Charles Chuang; Warren Chen; Anthony Yeh, all of Taipei, Taiwan

[73] Assignee: Dynacolor Inc., Taipei, Taiwan

[21] Appl. No.: 08/758,504

[22] Filed: Dec. 2, 1996

[51] Int. Cl.[7] .................................................. G04N 5/63
[52] U.S. Cl. .......................................... 702/183; 702/186
[58] Field of Search ..................................... 364/480, 579, 364/580, 528.27, 528.28; 348/180, 184, 194, 572, 818, 820, 181, 189; 361/1, 2, 5–7, 78–79, 86–87, 91, 101; 702/58, 60, 182, 183, 185, 186, 117; 307/43, 64; 315/86, 87, 129, 365

[56] References Cited

U.S. PATENT DOCUMENTS

| | | | |
|---|---|---|---|
| 4,641,064 | 2/1987 | Testin et al. | 351/411 |
| 4,858,006 | 8/1989 | Suzuki et al. | 348/189 |
| 4,870,529 | 9/1989 | Powell et al. | 361/56 |
| 5,162,623 | 11/1992 | Tachino | 307/64 X |
| 5,327,175 | 7/1994 | Tan et al. | 348/378 |
| 5,430,596 | 7/1995 | Hamaguchi et al. | 361/86 |
| 5,631,698 | 5/1997 | Lee | 348/178 |

*Primary Examiner*—Melanie Kemper
*Attorney, Agent, or Firm*—McDermott, Will & Emery

[57] ABSTRACT

The present invention relates to digital protection circuits in a CRT based display system for the purpose of providing hardware protections to the system before exactly removing a crisis. Self-testing and diagnostic capabilities are also supplemented in a CRT based monitor that are used to lacking in the monitor. The protection circuit basically includes a microprocessor section, a timer section, a register section, a digital to analog converter section, an analog to digital converter section, a non-volatile memory section, and an analog section. All sections can be integrated in a single chip and share a single controller. By using two diodes with their negative terminals coupled together to supplement capabilities of self-testing and diagnostic even when lack of power supplying. All implementations mentioned above can be easily achieved at a very low additional cost.

5 Claims, 4 Drawing Sheets

DIGITAL PROTECTION CIRCUIT FOR CRT BASED DISPLAY SYSTEMS

BACKGROUND OF THE INVENTION

1. Field of the Invention

The present invention related generally to the control circuits, and its application in display diagnostics and protection, in Cathode Ray Tube (CRT) based display systems, including but not limited to color monitors, monochrome monitors, computer color terminals, computer monochrome terminals, televisions, hi-definition television, and moniputers.

2. Description of the Prior Art

In the present day design, CRT (Cathode Ray Tube) based display systems are controlled primarily by analog circuit. Digital method plays only a minor role in such systems. With current technology, digital controller's assignment ends with the setting of static parameters. Current displays do not employ any intelligent circuit for protection and diagnostic purpose.

When a multisync monitor is switched from high resolution operation to low resolution operation, the sudden drop in frequency will subject the horizontal output transistor to very high voltages for some time until the power supply to the horizontal section reacted to the change. During this time period the horizontal output transistor is operating outside of the Safe Operating Area (SOA) defined by the transistor maker. Repeated excursion out of SOA degrades the reliability of the transistor.

Violation of SOA operation has been identified as the major failure mode for display systems. SOA circuit and other self test capabilities are absent from current display systems due to the high cost of implementation. When a display system fails, there is no diagnostic information available to a user or service personal. Display repair and service is a task that is difficult to learn and difficult to do.

SUMMARY OF THE INVENTION

The principle object of the present invention is to provide a protection circuit in a CRT based display that achieves the purpose of constraining operations of the display under a safe operating area.

The other object of the invention is to provide self-testing and diagnostic capabilities in a monitor with very low additional cost.

A further object of the invention is to combine the above circuits in a single integrated circuit offers a very low cost controller solution that offers significant features not available in much higher cost display systems.

The protection circuit is basically composed of a timer section, a microprocessor sections, a register section, a DAC (digital to analog converter) section, an ADC (analog to digital converter) section, a nonvolatile memory section, an SOA (safe operating area) section, and an analog section. All sections mentioned above can be integrated in a single chip and share the same controller.

Implementations of SOA disclosed in the invention is to implement hardware protection first when a crisis is detected depends on fast response to protect the integrity of the hardware, software protection then continuously implement for removing the crisis. Disadvantage of too late to be used in the crisis is easily removed.

To build the self-testing and diagnostic functions in the monitor is to couple negative terminals of two diodes, the positive terminal of one diode connects to the power supply of the monitor, and the positive terminal of the other diode connects to extra power supply, negative terminals of them connects with computers controlling the monitor. Conventional schemes of self-testing and diagnostic can be easily migrated to the monitor in accompanied with very low cost.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
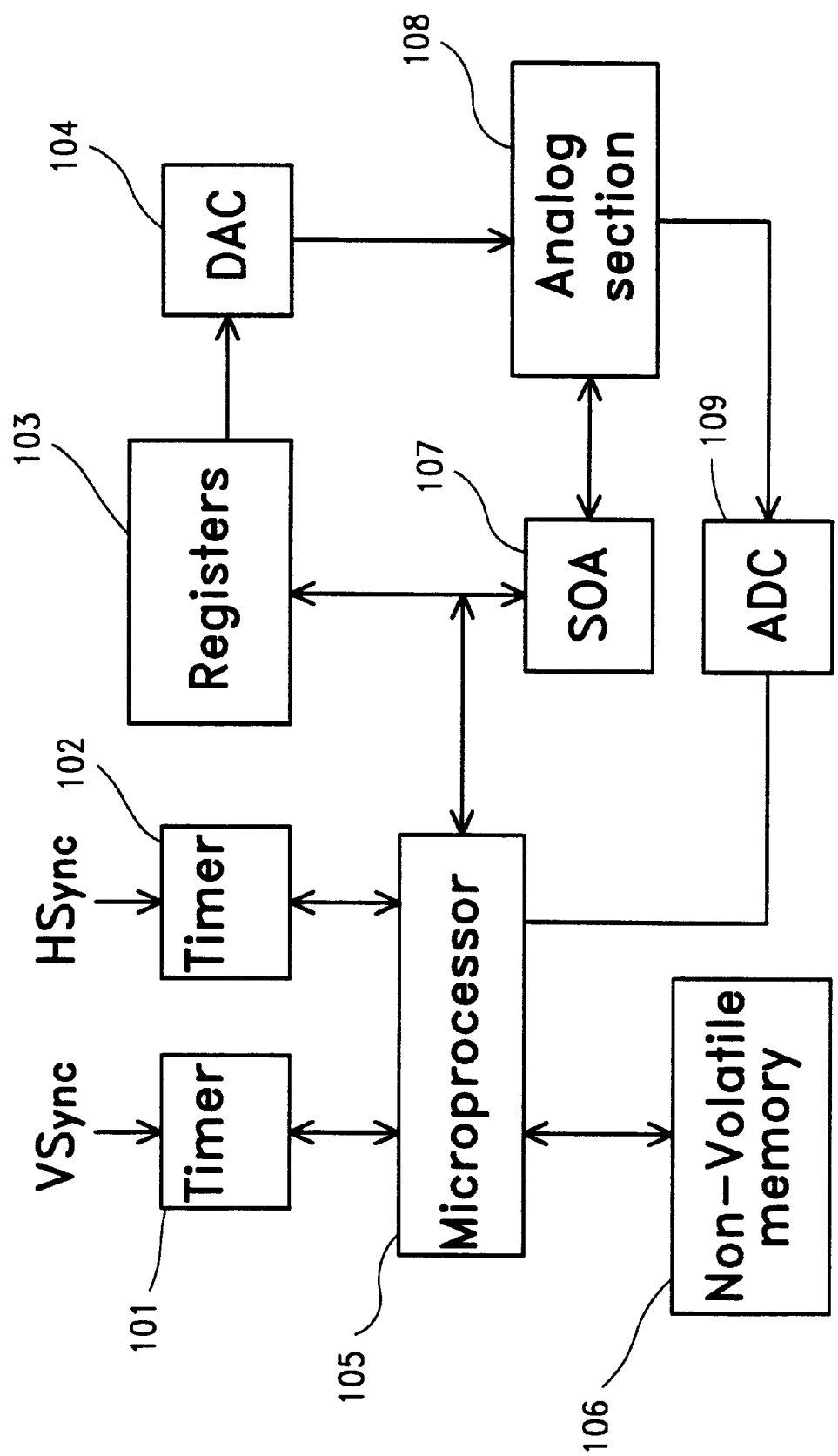
FIG. 1 is a block diagram of a display control system according to the present invention.

FIG. 1 shows a block diagram of a display protection circuit according to the present invention. Basic elements of the circuit are: timer 101 and 102 receive vertical synchronizing pulse (referring to "VSync" as for short) and horizontal synchronizing pulse (referring to "HSync" as for short), respectively; a register unit 103; a digital to analog converter (DAC) 104; a microprocessor 105; a nonvolatile memory 106; a safe operating area (referring to "SOA" for short) circuit 107; an analog section 108; and an analog to digital converter (ADC) 109. All elements mentioned above can be integrated in a single chip and share the same controller. Cost of establishing the novel circuits is reduced to a very low amount.

Conventional protection schemes are usually controlled by software procedure. A disadvantage of these scheme is too late to be use in a crisis. For example, the horizontal output transistor may suffer by a very high voltage caused by a sudden drop. When this crisis is detected, the display system does not get rid of the crisis until the microprocessor processes it at its spare time. Owing not to remove the crisis in time may damage the horizontal output transistor, and also injure the display system forever. Obviously, the display system must restrict deterioration caused by the crisis from getting worse before the crisis is removed.

Figure 4:
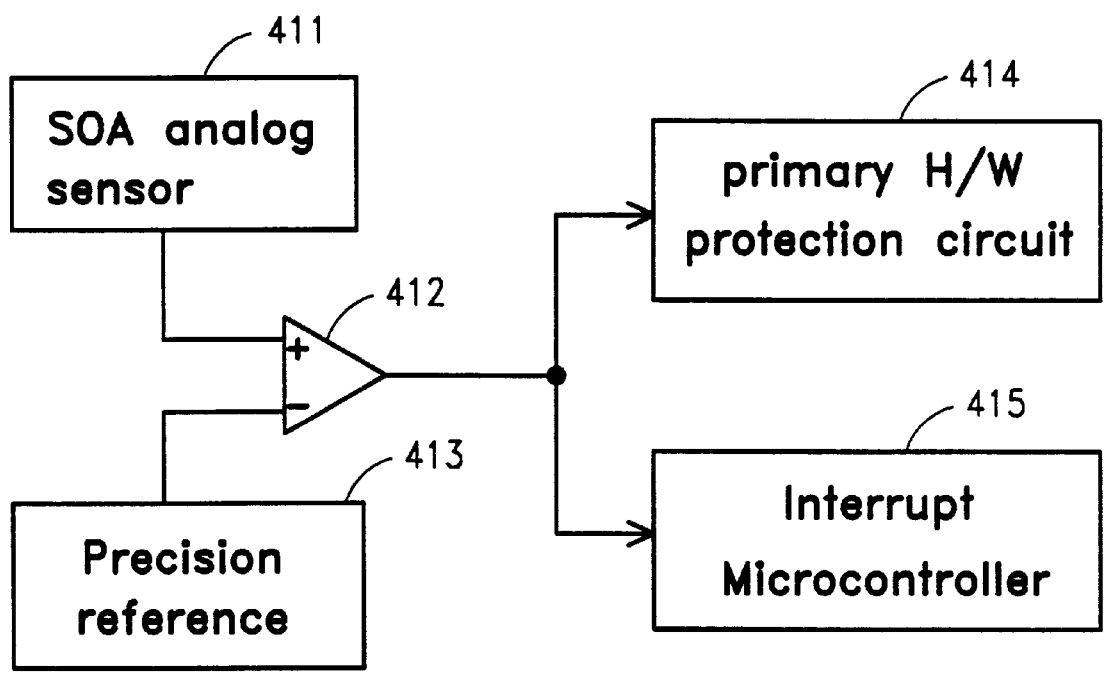
FIG. 4 shows a hardware block diagram for achieving protection under a safe operating area (SOA)

FIG. 4 shows a hardware block diagram for implementing safe operating area (SOA) protection. Input of analog sensors 411 are conditioned and then compared with precision reference 413 by using comparator 412 that marks the trigger point for hardware protection circuit 414. As an example, the hardware protection circuit for horizontal output transistor is a switch that turns off the current flow into the collector and prevent the collector voltage from surging beyond the SOA specification. Comparator 412 also feeds into the interrupt input of microprocessor 415 and triggers the software protection of this method.

Hardware protection ensures very fast response to protect the integrity of the hardware, however, it does not address the cause nor the recovery of such overload condition. The hardware protection circuit 414 only restricts deterioration from getting worse before the microprocessor processing the detected crisis, however, jobs of removing the crisis and remedy from damage are also left to the microprocessor.

Figure 5:
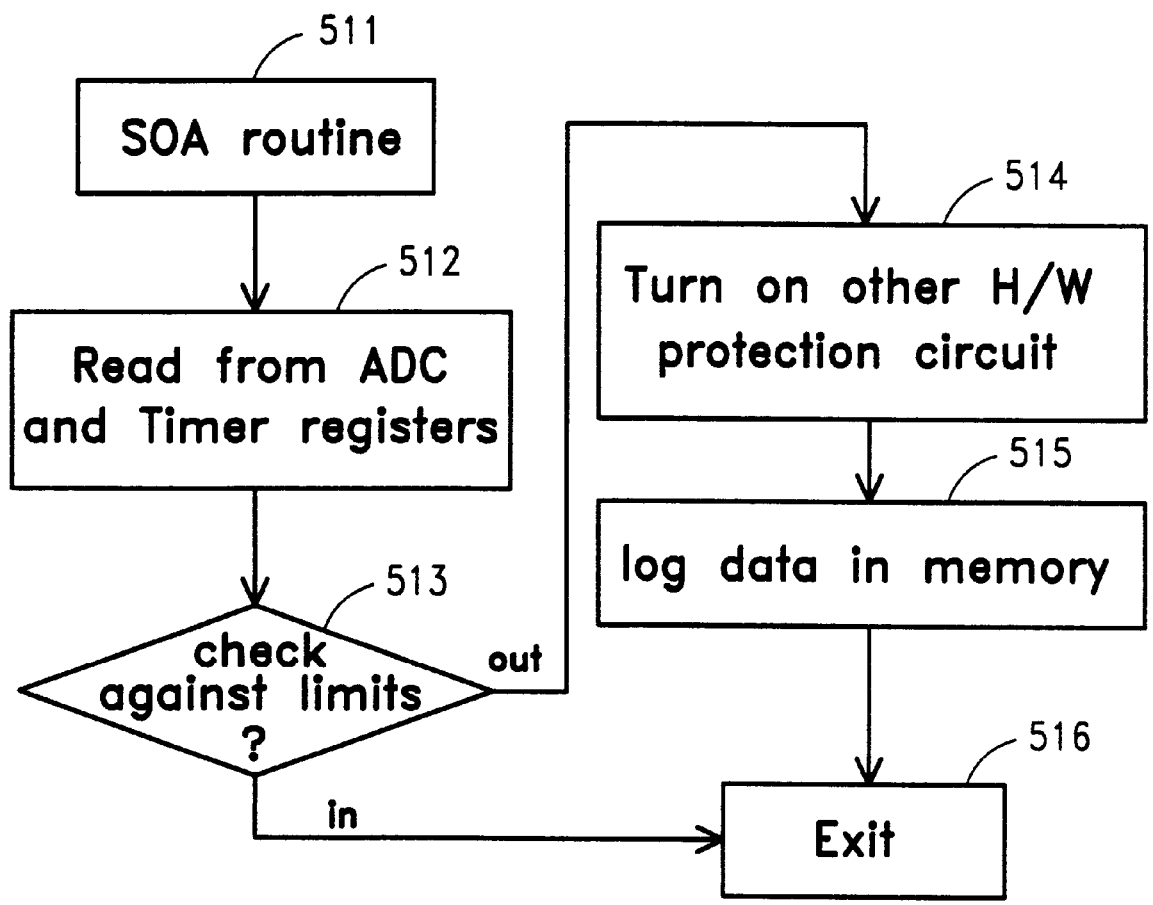
FIG. 5 illustrates a flow chart for implementing safe operating area protection.

FIG. 5 illustrates a flow chart for implementing SOA protection. SOA routine is triggered by the interrupt input of the microprocessor (step 511). Once activated, it reads data from an ADC and timer registers (step 512) and check against previously set limits (step 513). In the case of horizontal output transistor protection, operating frequency shift is the cause of triggering and other protection circuit (step 514), in this case change in voltage supply appropriate for the new operating frequency will be instituted. This action can be logged in memory (step 515) before exiting the routine (step 516). The software SOA routine address the cause and the remedy of overload condition.

A self-test routine can be resided in the main loop of the microprocessor, making it a continuous self-test. Unfortunately, typical monitor lacks of capability of giving messages when it breaks down, although self-test routine has been a popular task. Main reason for lack of self-test routine in a monitor is that much cost is needed for implementing. A novel circuit for improving self testing and diagnostic capabilities of a CRT based system on a PC is disclosed following.

Figure 3:
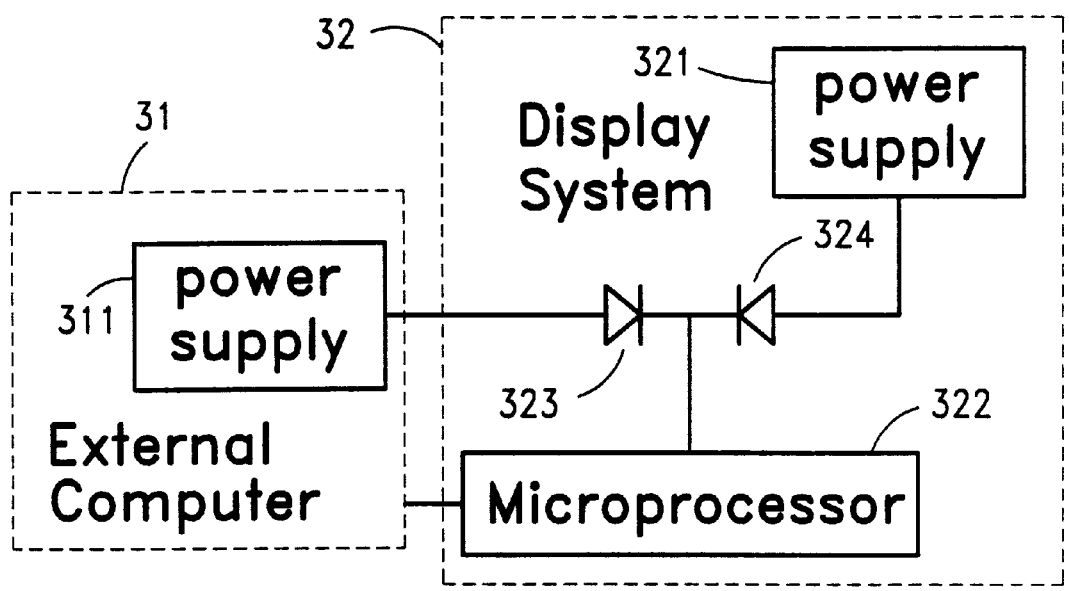
FIG. 3 represents a block diagram for realizing external diagnostic method.

As shown in FIG. 3, using a simple diode isolation method with negative terminals of both diodes 323 and 324 coupled together, microprocessor can stay active even when the display power is off. Retrieving diagnostic information from a non-volatile memory, the microprocessor 322 in a computer 32 can send the fault information to an external computer 31. This can be done even with a defective display power supply (ex: power supply 321 is broken down), significantly advancing the trouble shooting capability of a display system (uses power supply 311). There are several communication channels available that will supply power to the display system (ex: universal serial bus, and access bus) for this method of diagnostic to be practical. The self-test concept can extended to achieve continuous self calibration.

Figure 2:
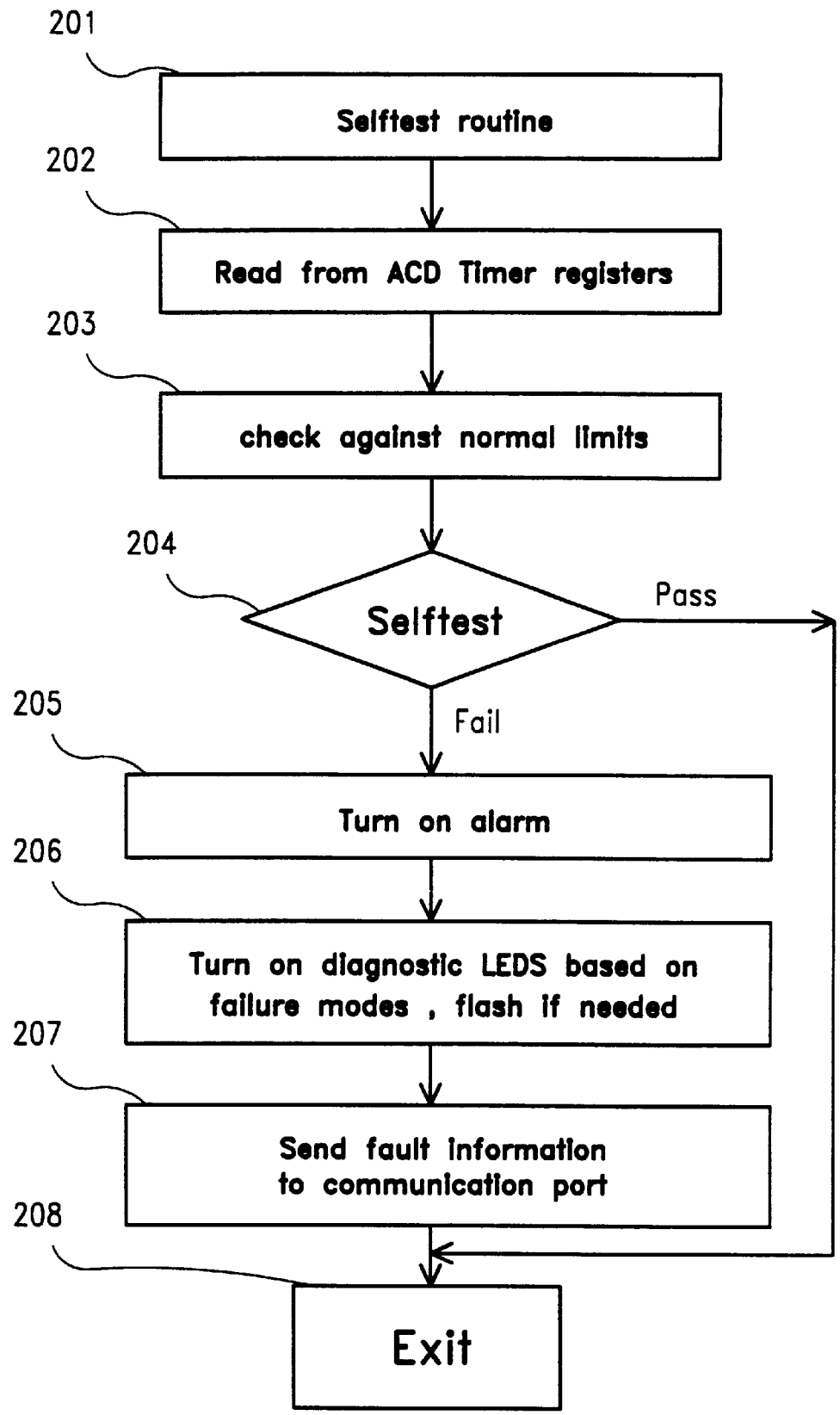
FIG. 2 is a diagram representing a method for selftesting and diagnostic output.

FIG. 2 is a flow diagram representing a method for self-testing and diagnostic routine. After the self-test routine is running (step 201), status of a system can be read from ADC and timer input ports (step 202). The status is analyzed against with predetermined limits for normal operations (step 203). If error conditions are detected (step 204), an alarm is turned on to notify a supervisor, at first (step 205). Error code is then displayed on the display front panel LED's (step 206), and the failure mode is sent to external communications ports (step 207). Whole selftest routine then stops after the selftesting task is done (step 208).

In conclusion, the novel circuit can protect the display system more completely than conventional schemes by adding an SOA circuit in the same chip. Furthermore, make up the self-testing and diagnostic capabilities which are used to lacking in monitors. The most important thing is that very low costs are needed to achieve both the above implementations.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A digital circuit for achieving self-testing and diagnostic in a system with CRT based monitor, wherein said circuit comprises:

sensing means for generating analog type status information designating current status of said system;

analog to digital converting means for converting said current status information from analog into digital type;

reference providing means for generating reference information representative of specifications of said system operating under a safe operating area (SOA);

comparing means responsive to said digital type of said current status information and said reference information for generating detecting information representative of whether a crisis is detected in said system;

major protecting means responsive to said detecting signals for restricting deterioration caused by said crisis from getting worse;

internal power supplying means for generating internal power signals;

external power supplying means for providing external power signals to said CRT based monitor when said internal power supplying means is defective; and diagnostic means responsive to said internal power signals and said external power signals for generating power designating signals, wherein said diagnostic means comprises:

a first diode having a positive terminal and a negative terminal, said positive terminal of said first diode receiving said external power signals;

a second diode having a positive terminal and a negative terminal, wherein said positive terminal of said second diode receives said internal power signals, and said negative terminal of said second diode is coupled with said negative terminal of said first diode, and generates said power designating signals; and processing means responsive to said power designating signals for generating diagnostic signals for diagnostic purpose, and responsive to said detecting signals for generating diagnostic signals for removing said crisis and for diagnostic purpose.

2. The circuit according to claim 1, wherein said comparing means comprises a comparator.

3. The circuit according to claim 1, said major protecting means further comprising hardware protection circuit for protecting the integrity of said system.

4. The circuit according to claim 1, said diagnostic signals further comprising interrupts to trigger software protection procedure.

5. The circuit according claim 1, wherein said processing means comprises a process computer.

* * * * *